(12) United States Patent
Gilligan

(10) Patent No.: US 6,848,837 B2
(45) Date of Patent: Feb. 1, 2005

(54) FIBRE-OPTIC CONNECTOR

(76) Inventor: Simon Charles Gilligan, 68 Shaftesbury Avenue, Bristol, BS6 5LY (GB)

(*) Notice: Subject to any disclaimer, the term of this patent is extended or adjusted under 35 U.S.C. 154(b) by 0 days.

(21) Appl. No.: 10/073,050

(22) Filed: Feb. 12, 2002

(65) Prior Publication Data
US 2003/0152333 A1 Aug. 14, 2003

(30) Foreign Application Priority Data

Feb. 8, 2002 (GB) .............................................. 0203108

(51) Int. Cl.⁷ ................................................. G02B 6/36
(52) U.S. Cl. ....................................................... 385/80
(58) Field of Search ............................... 385/53, 76–78, 385/80

(56) References Cited

U.S. PATENT DOCUMENTS

| 4,746,194 A | 5/1988 | Rasmussen |
| 4,787,699 A | 11/1988 | Moulin |
| 4,984,865 A | 1/1991 | Lee et al. |
| 6,179,658 B1 * | 1/2001 | Gunay et al. ................ 439/587 |
| 6,325,670 B2 * | 12/2001 | Murayama ................... 439/587 |

FOREIGN PATENT DOCUMENTS

| EP | 0 479 415 A2 | 4/1992 |
| EP | 0 810 455 A1 | 12/1997 |

* cited by examiner

Primary Examiner—Khiem Nguyen
(74) Attorney, Agent, or Firm—Nath & Associates PLLC; Harold L. Novick; Marvin C. Berkowitz

(57) ABSTRACT

An optical fibre connector comprises a housing and an internal core member defining a channel means for receiving an optical fibre, a chamber for receiving a quantity of curable adhesive being in communication with the channel means, the connector including plunger means to reduce the volume of the chamber, whereby adhesive contained in the chamber in use is urged around an optical fibre disposed in the channel before the adhesive cures. The connector may include a ferrule at the front end, the ferrule carrying an optical fibre as a stub having a distal end flush with the front face of the ferrule and a proximal end extending from the rear face of the ferrule and terminating in an alignment tube coaxial with the channel means of the internal core member.

12 Claims, 3 Drawing Sheets

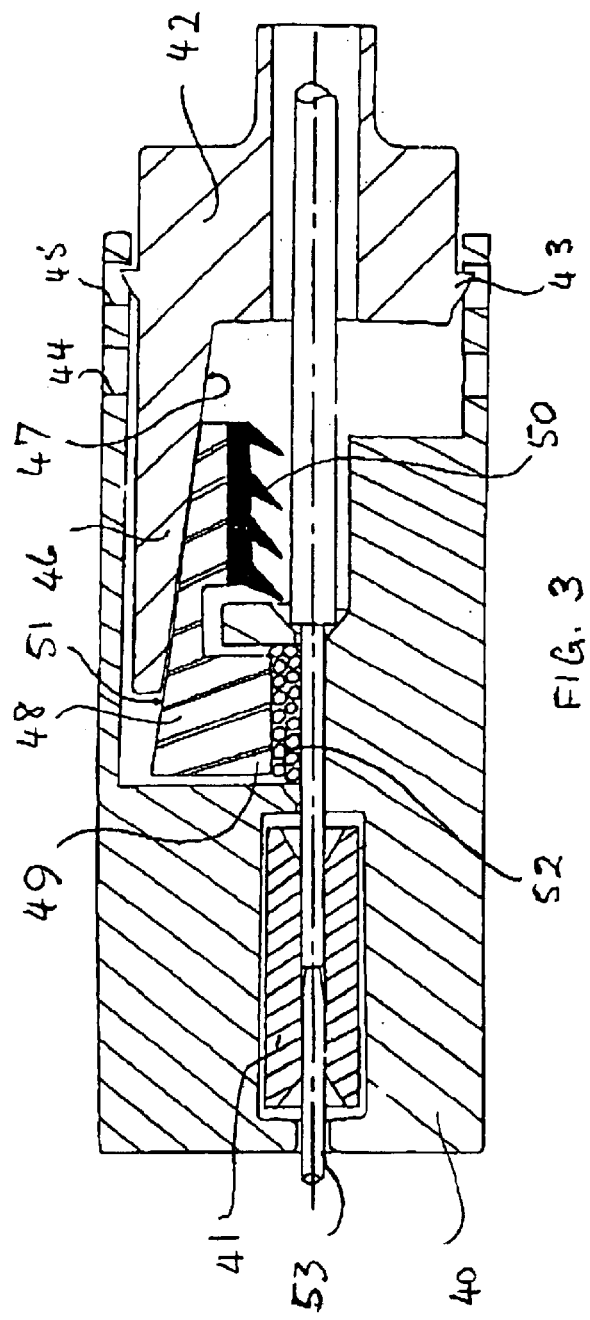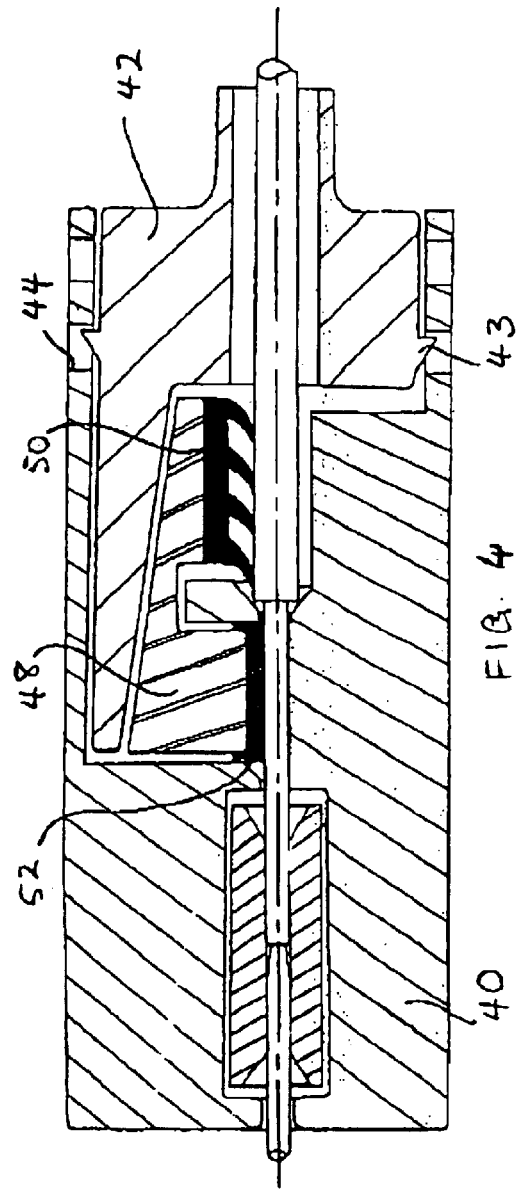

FIBRE-OPTIC CONNECTOR

This invention relates to optical fibre connectors and is particularly intended to provide such a connector which can be used when installing optical fibre cables on site, typically where the free ends of optical fibres are required to be connected to standing ends in a junction cabinet, for example.

Optical fibre cables generally comprise a central glass core with a surrounding glass cladding, the core and cladding having respectively different refractive indices and constituting the light-transmitting optical fibre, and one or more outer protective sheaths formed form PVC or other suitable material, of which the outer sheath is often referred to as the buffer coating or buffer jacket.

Optical fibre connectors are devices for forming butt joints or splices between lengths of optical fibre. Such connectors support the end region of an optical fibre and can be mechanically connected to another connector or another part, of the connector to form a joint. In order to minimise losses of transmitted light at the joint, it is necessary for the respective end faces of the fibre to be polished so that they are perfectly planar as possible and normal to the axis of the fibre and for the fibres to be axially aligned with their respective end faces contiguous. To meet these requirements, various types of connector have been developed which provide an immobilised mount for the fibre and permit the end face thereof to be polished. For example, U.S. Pat. No. 4,746,194 describes a connector having centering elements for supporting the end of the fibre while a curable material such as an epoxy adhesive is introduced within the connector body whereby, after curing has taken place, the end of the connector together with the spatially-fixed fibre can be ground to present a flat end surface. U.S. Pat. No. 4,984,865 describes a connector in which the optical fibre can be introduced into the connector body containing a thermoplastic adhesive, in which the adhesive is initially heated to reduce its viscosity and to allow passage therethrough of the optical fibre, the adhesive subsequently re-hardening and allowing the fibre end to be polished.

However, both such connectors are unsuitable for use on site or "in the field" since the post-cure grinding or polishing operation is difficult to carry out under such circumstances with the necessary accuracy and precision. In addition, the use of a thermoplastic adhesive, as described in U.S. Pat. No. 4,984,865, requires the use of heating equipment which is inconvenient in the field and in any event the adhesive may become unstable at temperatures greater than around 60° C., thus making such connectors unsuitable for use in elevated-temperature environments.

A further proposal has been to use a pre-terminated and polished fibre stub in a connector body, whereby the cleaved—that is, pre-cut to the desired length—fibre is aligned and retained within the body by mechanical clamp arrangements. Such connectors are suitable for use in the field but do not effect a permanent and spatially-stable joint.

It is an object of the present invention to provide an optical fibre connector which includes an improved adhesive system to provide a permanent and stable joint and preferably can be used in the field without the need to polish the fibre end face.

In one aspect, the present invention provides an optical fibre connector comprising a housing and an internal core member defining a channel means for receiving an optical fibre, a chamber for receiving a quantity of curable adhesive being in communication with the channel means, the connector including plunger means to reduce the volume of the chamber, whereby adhesive contained in the chamber in use is urged around an optical fibre disposed in the channel before the adhesive cures.

The adhesive should be maintained in the chamber in the stable pre-cure state until the plunger means is activated, whereby curing is initiated. The adhesive therefore may comprise a two-part epoxy adhesive in which the respective parts are contained in frangible casings which rupture by compression as the chamber reduces in volume to cause the parts to mix and initiate the curing process, although in an alternative embodiment the adhesive may be of the air-curing type and maintained in the chamber in a rupturable air-impervious, bag or other container.

Preferably, the plunger means includes fibre-engaging resilient means which exert on the fibre as volume-reduction movement of the plunger means takes place a fibre-stabilising force within the housing to retain the fibre in place while the adhesive cures. The resilient means is preferably directionally biassed to maintain on the fibre a force which urges it towards the front end of the connector, that is, towards the other fibre forming the joint. Such directionally-biassed resilient means may for example comprise angled fingers or ridges which under compression exert an axial force on the fibre toward the front end of the connector.

Preferably, optical fibre connectors according to the invention include a ferrule at the front end, the ferrule carrying an optical fibre as a stub having a distal end flush with the front face of the ferrule and a proximal end extending from the rear face of the ferrule and terminating in an alignment tube coaxial with the channel means of the internal core member. The front face of the ferrule and the optical fibre may thus be ground and polished in the factory so that, when operating on site, the engineer need only insert an optical fibre in the connector from the rear and join it to the proximal end of the fibre mounted in the ferrule.

In preparing the optical fibre cable to be inserted in the connector, the engineer will strip away a length of the outer buffer coating or coatings and cleave the exposed fibre to the desired length using a conventional cleaving tool. Such tools, however, often do not leave a cleaved end face which is flat over the entire area but rather leave a peripheral protruding lip. Such a lip, unless removed, interferes with the formation of an acceptable butt joint with an adjacent fibre. However, if the proximal end of the ferrule-mounted fibre stub is cut with a laser, whereby the fibre end has a frusto-conical shape with a flat end face of reduced diameter, the laser-cut face can thus form an optically-acceptable butt joint with the mechanically-cleaved face of the fibre to be inserted in the connector, notwithstanding the protruding lip which does not interfere with the reduced-diameter face.

The plunger means preferably comprises a compression head which may be directly or indirectly activated to reduce the volume of the chamber and apply pressure to the adhesive therein.

In a directly-activated embodiment, the compression head may be manually depressable from outside the housing from an outer position with the chamber at maximum volume to an inner position with the chamber at minimum volume. In an indirectly-activated embodiment, the compression head may be activated within the housing by a co-operating activation member which extends from the housing and which is manually movable to cause the compression head to move from the outer to the inner position. The compression head may for example comprise a sloping ramp surface which co-operates with a sloping ramp surface on the activation member, or in the housing itself, to translate axial movement of the activation member relative to the housing to radially-inward movement of the compression head.

The plunger means preferably includes means cooperable with the housing to maintain the compression head in the inner position. Such means may comprise snap-action retainers such as pips and corresponding depressions.

Optical fibre connectors according to the invention preferably include a resiliently-mounted tail portion to the housing to create in known manner a forwardly-directed force on the main body of the housing to ensure that the front face of the ferrule maintains contact with the part with which it forms a joint. The housing may also include a manually-operable latching member to retain it in place in a junction cabinet.

Embodiments of the invention will now be described by way of example with reference to the accompanying drawings, of which FIG. 1 is a longitudinal section of a first embodiment of a connector according to the invention before activation of the adhesive;

FIG. 3 shows a longitudinal section of a further embodiment of a connector according to the invention before activation of the adhesive; and FIG. 4 shows the embodiment of FIG. 4 after activation of the adhesive.

Figures 1, 1A:
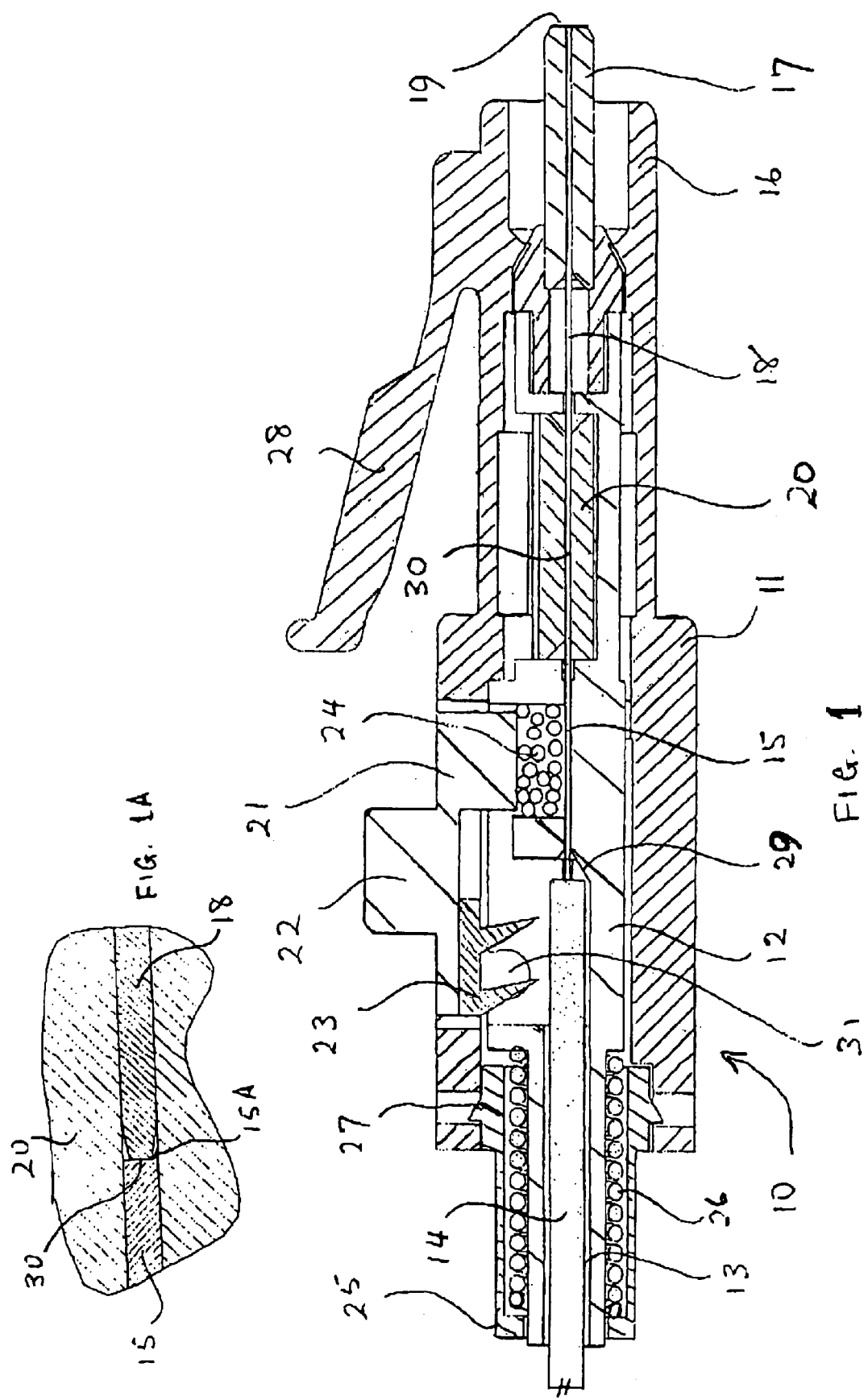
FIG. 1A is a fragmentary view of part of the connector on an enlarged scale, showing the junction between the optical fibres.

Referring firstly to FIG. 1, the connector shown generally at 10 consists essentially of an outer housing or casing 11 having an internal core member 12 defining a longitudinal channel or recess 13, preferably in the form of a V-shaped groove when viewed axially, for receiving an optical fibre. The channel 13 is sufficiently broad in the rear portion of the connector to receive the outer buffer or covering 14 of an optical fibre and is narrower towards the front end to receive the optical fibre 15, the buffer having been stripped away. The front end or nose portion 16 of the connector housing contains a ferrule 17 in which is mounted an optical fibre stub element 18 which at the front end is flush with and polished with the front face 19 of the ferrule, the rear end of the optical fibre stub element 18 being contained within an alignment tube 20 also mounted in the core member 12 of the connector.

Mounted in the upper part of the housing 11 is a plunger member 21 integrally formed with an upstanding button 22. Resilient fingers 23, angled towards the nose of the connector as shown, are carried underneath the operating button 22. A chamber is defined between the plunger member 21 and the core member 12, the chamber being filled with a two-part epoxy adhesive, the respective parts being contained in pressure-rupturable micro spheres 24.

In known manner, the housing includes a rear extension 25 maintained in place against the force exerted by a coil spring 26 by snap-action connectors 27. The connectors provide for limited axial movement of the housing extension 25 towards the main housing 11, against the force exerted by the spring. At the front end, the housing carries a resiliently-depressable latch member 28 to allow the housing to be inserted and locked in an aperture in a junction cabinet.

In use, an optical fibre cable to be inserted in the connector is initially stripped of its buffer coating or coatings to expose a length of optical fibre. The cut and stripped end of the optical fibre is inserted in the axial aperture in the rear extension 25 of the housing 11 until the end of the buffer is in the region of the internal shoulder 29 between the larger- and smaller-diameter parts of the channel 13. The front end of the exposed fibre 15 then abuts the rear face of the optical fibre stub 18 mounted in the ferrule 17 to form a junction 30. If the end of the fibre 15 has been cleaved, the end thereof may have a peripheral lip 15A, as shown in FIG. 1A. However, the laser-cut end of the optical fibre core 18 being in the form of a frustum of a cone, a smaller-diameter end face is presented at the junction 30, which thus forms an optically-acceptable butt joint with the end of the optical fibre 15, despite the peripheral lip left thereon by use of the cleaving tool.

Figure 2:
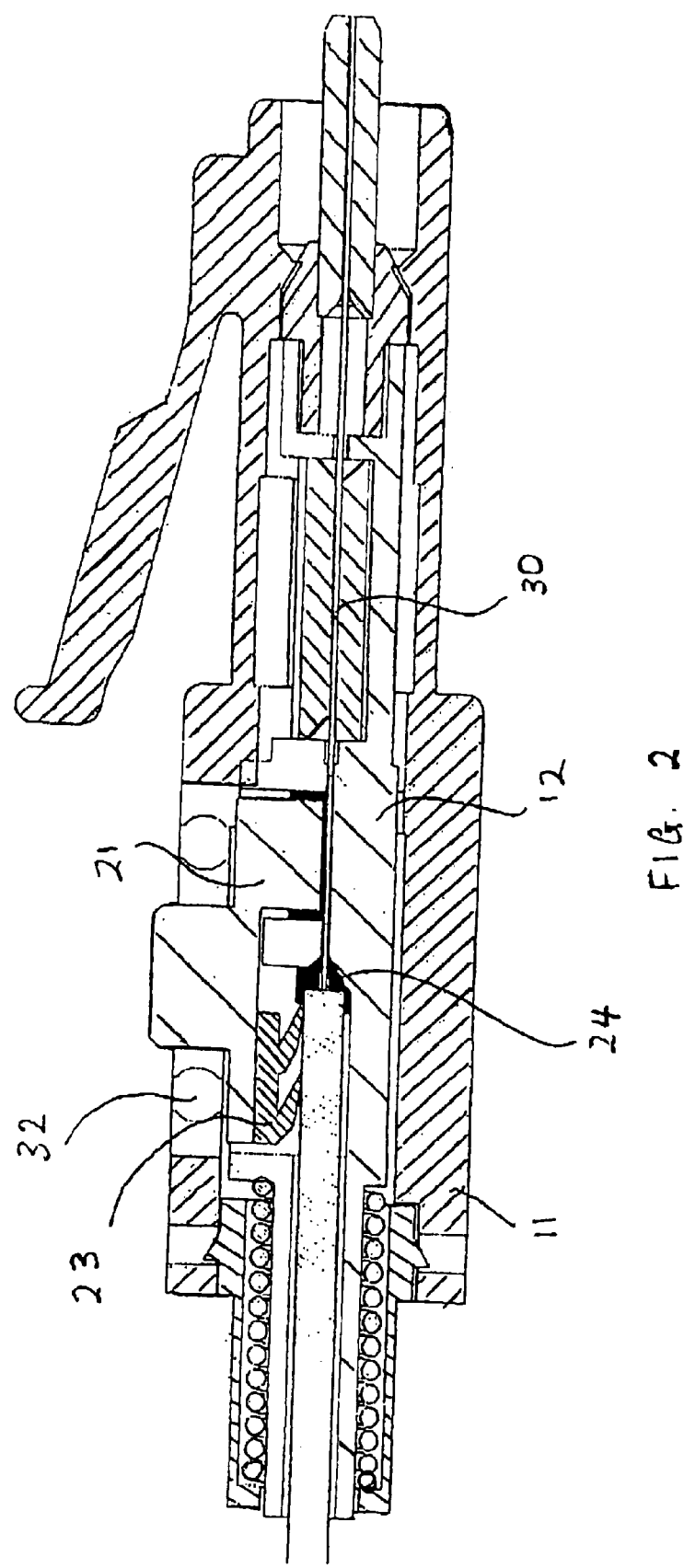
FIG. 2 shows the connector of FIG. 1 after activation of the adhesive.

With the optical fibre 14 in the position shown, the activation button 22 of the plunger 21 is manually depressed firstly to bring the fingers 23 in contact with the buffer of the cable, the angle of the fingers having the effect of urging the buffer towards the front end of the connector to maintain intimate contact at the junction 30 between the respective ends of the optical fibres in the alignment tube 20, and secondly to rupture the microspheres 24 so as to mix the respective parts of the epoxy resin and initiate the curing reaction. As shown in FIG. 2, the adhesive has spread under pressure exerted by the plunger around the entire length of the exposed end of the fibre from behind the alignment tube as far as the front end of the buffer.

The plunger is maintained in the depressed position by virtue of lateral protrusions (not shown) which engage by snap action in depressions formed in the sides of the housing which define a slot for receipt of the plunger. The depressions which maintain the plunger in the depressed position are shown at 31 in FIG. 1 and the depressions which maintain the plunger in the pre-activation position are shown at 32 in FIG. 2.

With reference to FIGS. 3 and 4, the connector has an outer housing 40 containing an alignment tube 41, similar to that shown in FIGS. 1 and 2. Other components of the nose end of the connector are not shown for clarity. At the rear of the housing, the housing carries a core element 42 which is axially movable between a rear position as shown in FIG. 3 and a forwards position as shown in FIG. 4, forwards movement being permitted and rearward movements prevented by virtue of resilient tangs 43 which cooperate with corresponding apertures 44, 45 formed in the housing. The core member 42 has a forwardly-extending upper tongue 46, the lower face 47 of which is formed at an acute angle to the axis of the connector. A plunger member 48 has a pressure-applying front portion 49, resilient fingers 50 being attached to the rear portion and angled forwardly. The plunger member 48 has a sloping upper face 51. Microspheres of adhesive 52 are contained in the chamber defined between the plunger member 48 and the housing 40.

In use, an optical fibre cable is prepared as described with reference to FIGS. 1 and 2 and inserted through the axial channel defined by the core member 42 and the housing 40, so that the end of the exposed optical fibre engages in the alignment member 41 and abuts the rear end of the ferrule-mounted fibre stub 53. The core member 42 is then manually pushed forwardly so that, as shown in FIG. 4, the tangs 43 disengage from slots 45 and engage in slots 44, the respective sloping surfaces of the core member 42 and plunger member 48 co-operating to urge the plunger member radially inwardly to rupture the microspheres, spread the adhesive around the optical fibre and engage the fingers 50 with the buffer of the optical fibre.

What is claimed is:

1. An optical fibre connector comprising
a housing,
an internal core member defining a channel which can receive an optical fibre,
an enclosed chamber in the housing having an opening therein which places the chamber in communication with the channel,
a pressure rupturable casing containing a spreadable, curable adhesive and located in the chamber,
a plunger which upon actuation reduces the volume of the chamber such that the spreadable, curable adhesive is spread out through the chamber opening into the channel and urged around an optical fibre disposed in the channel before the adhesive cures.

2. A connector according to claim 1, in which the plunger is indirectly activatable and comprises a compression head within the housing and a co-operating activation member which extends from the housing and which is manually movable to cause the compression head to reduce the chamber volume.

3. A connector according to claim 2, in which the compression head comprises a sloping ramp surface which co-operates with a sloping ramp surface on the activation member, or in the housing itself, to translate axial movement of the activation member relative to the housing to radially-inward movement of the compression head.

4. A connector according to claim 1, in which the plunger includes means cooperable with the housing to maintain the compression head in the inner position.

5. A connector according to claim 1, in which the adhesive comprises an air-curable adhesive in which the adhesive is contained in a rupturable air-impervious container.

6. A connector according to claim 1, wherein the adhesive is contained in a plurality of pressure rupturable casings, and
in which said chamber has a further opening through which the plunger extends so that upon actuation of the plunger, the plunger can contact and break the pressure rupturable casings so that the adhesive contained in the casings is urged to spread out through the first mentioned chamber opening into the channel.

7. A connector according to claim 6, in which the adhesive comprises a two-part epoxy adhesive in which the respective parts are contained in respective pressure rupturable casings.

8. A connector according to claim 6, in which the plunger included a fibre-engaging resilient member.

9. A connector according to claim 8, in which the resilient member is directionally biassed to maintain on the fibre in use a force which urges the fibre towards the front end of the connector.

10. A connector according to claim 6, further including a ferrule at the front end, the ferrule carrying an optical fibre as a stub having a distal end flush with the front face of the ferrule and a proximal end extending from the rear face of the ferrule and terminating in an alignment tube coaxial with the channel of the internal core member.

11. A connector according to claim 10, in which the fibre stub end has a frusto-conical shape with a flat end face of reduced diameter.

12. A connector according to claim 6, in which the plunger comprises a compression head which is directly activatable to reduce the volume of the chamber and apply pressure to the adhesive therein.

* * * * *